(12) United States Patent
Hahlweg

(10) Patent No.: US 6,437,854 B2
(45) Date of Patent: Aug. 20, 2002

(54) RADAR SYSTEM FOR DETERMINING OPTICAL VISUAL RANGE

(75) Inventor: Cornelius Hahlweg, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/778,287

(22) Filed: Feb. 7, 2001

(30) Foreign Application Priority Data

Feb. 8, 2000 (DE) .......................... 100 05 421

(51) Int. Cl.⁷ .................. G01C 3/08; G01N 21/00
(52) U.S. Cl. ........................... 356/5.09; 356/342
(58) Field of Search .................. 356/5.09, 342

(56) References Cited

U.S. PATENT DOCUMENTS

| | | | |
|---|---|---|---|
| 4,167,329 A | * 9/1979 | Jelalian et al. | 356/5 |
| 4,211,485 A | * 7/1980 | Koreicho | 356/5 |
| 4,960,329 A | * 10/1990 | Schofield | 356/5 |
| 4,973,154 A | * 11/1990 | McMichael et al. | 356/4.5 |
| 5,216,477 A | * 6/1993 | Korb | 356/28.5 |
| 5,262,836 A | * 11/1993 | Nourrcier | 356/5 |
| 5,608,514 A | * 3/1997 | Stann et al. | 356/5.09 |
| 5,621,514 A | * 4/1997 | Paranto et al. | 356/5.09 |
| 6,037,894 A | * 3/2000 | Pfizenmaier et al. | 342/70 |
| 6,288,777 B1 | * 9/2001 | Froehlich et al. | 356/5.15 |

FOREIGN PATENT DOCUMENTS

| | | |
|---|---|---|
| DE | 40 16973 | 6/1991 |
| DE | 40 40 572 | 6/1992 |
| DE | 41 04 792 | 8/1992 |
| DE | 42 01970 | 8/1992 |
| DE | 41 28012 | 2/1993 |
| DE | 42 00 057 | 7/1993 |
| DE | 42 33379 | 3/1994 |
| DE | 43 01228 | 4/1994 |
| DE | 43 24 308 | 12/1994 |
| DE | 43 26 170 | 2/1995 |
| DE | 43 34 079 | 4/1995 |
| DE | 2 290 188 | 12/1995 |
| DE | 44 27 352 | 1/1996 |
| DE | 400 5919 | 12/1996 |
| DE | 2 307 369 | 5/1997 |
| DE | 196 29 712 | 1/1998 |
| DE | 196 29 713 | 1/1998 |
| DE | 196 32 889 | 2/1998 |
| DE | 197 49 397 | 5/1998 |
| DE | 196 42 967 | 6/1998 |
| DE | 196 52 944 | 6/1998 |

* cited by examiner

Primary Examiner—Thomas H. Tarcza
Assistant Examiner—Brian Andrea
(74) Attorney, Agent, or Firm—Kenyon & Kenyon

(57) ABSTRACT

A radar system which is used for determining optical range includes a frequency analyzer for the analysis of differential frequency signals, which originate from a mixture of the transmitted signal with the received signals, for example reflected from a fog bank. The frequency spectrum images the distance profile of the fog bank.

10 Claims, 2 Drawing Sheets

RADAR SYSTEM FOR DETERMINING OPTICAL VISUAL RANGE

BACKGROUND INFORMATION

A radar system is described in German Patent Application No. 196 32 889, in which, however, the range finding is limited to the measurement of distances to solid bodies.

SUMMARY OF THE INVENTION

In contrast to this, the radar system according to the present invention has the advantage of being capable of creating distance profiles to diffuse objects, in particular fog banks. Thus, for example, quantitative information concerning visual range can be obtained in a motor vehicle independently of the driver. This functionality can be integrated here advantageously via simple additional technical measures in a device which is already used for distance sensing, for example for parking or for automatic vehicle control systems. Also advantageous is the simple feasibility of digital signal processing as a result of the relatively low-frequency difference signals to be used, for which inexpensive digital signal processors are available. Particularly advantageous is the provision of automatically operating compensation means, which permit realistic imaging of diffuse objects, in particular of fog banks. In particular, the driver can detect the actual extent and the actual spatial density distribution of such areas and thus realistically evaluate the traffic situation/obstacle to visibility.

If light which is frequency-modulated in its intensity is used as a transmitted signal, a real image of areas of possible obstacles to visibility is provided by the type of the measurement itself, since the transmitted signal is of the same physical nature as the light beams which are detected by the human eye and produce the optical image in the eye. Moreover, in the case of using light as an information carrier, as opposed to measurements in the radio frequency range, it is not necessary to pay attention to spectral purity or to a band limitation, so that frequency modulation taking account of harmonics can also be performed in a rectangular form without impairing the measurement result. In the case of systems in the radio frequency range, on the other hand, strict adherence to the assigned frequency bands (for the most part, moreover, very narrow-band ranges, cf. Industrial Scientific Medical bands) is necessary (key words: wireless service, electromagnetic compatibility, etc.); therefore a radar signal used in the radio frequency range cannot be simply a rectangular sequence, since the harmonic waves transmitted in this case would cause a "contamination" far from the assigned band. In addition, high-performance laser diode drivers, which are offered for optical communication and are designed for pulse modulation, may be used for the process of visual range determination.

Furthermore, the transmitted signal is emitted divergently in an advantageous way, in order to obtain a good averaging over the density of any existing fog layers.

DETAILED DESCRIPTION

Figure 1A:
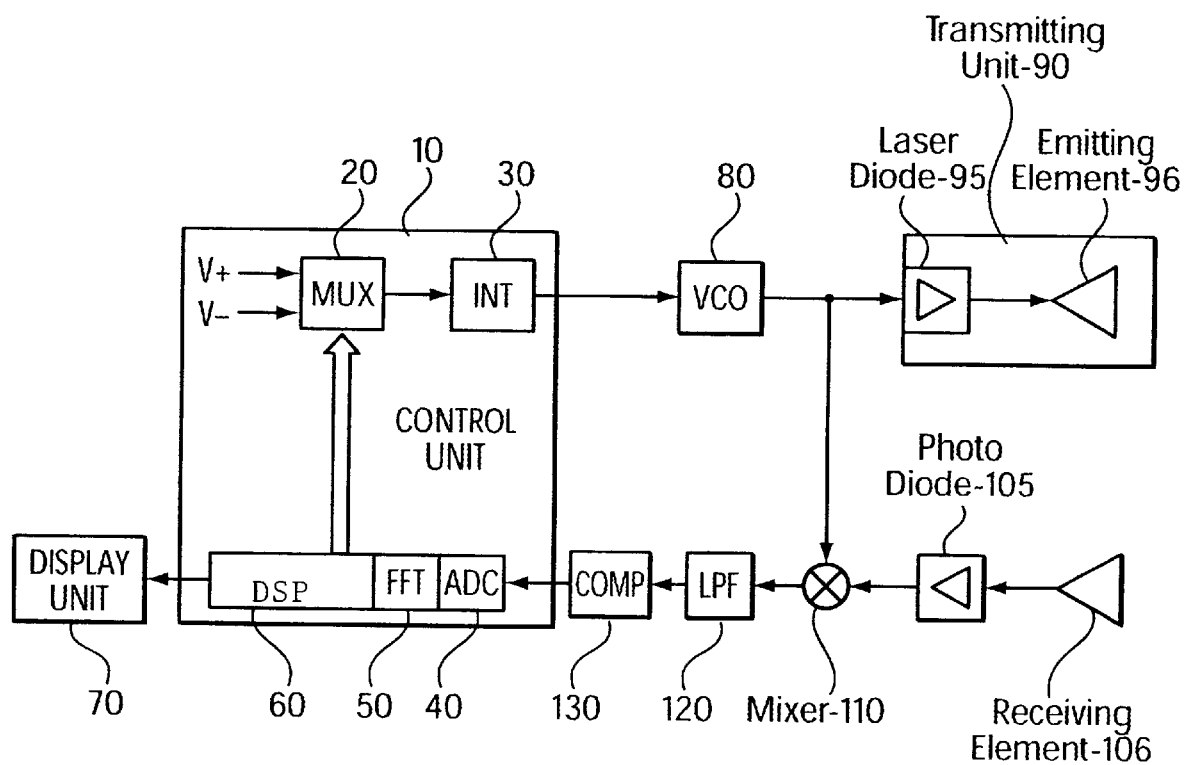
FIG. 1a shows a first embodiment.

FIG. 1a shows a radar system with a control unit 10. Control unit 10 has an analog multiplexer (MUX) 20, which is supplied with a positive direct voltage V+ and a negative direct voltage V−. The multiplexer is connected with an integrator (INT) 30. Control unit 10 further has a digital signal processor (DSP) 60, which controls multiplexer 20. Signal processor 60 contains a fast Fourier transformer 50 (abbreviated "FFT"), and an analog-digital converter (ADC) 40. DSP 60 is connected to a display unit 70. Integrator 30 controls a frequency-modulatable oscillator (VCO) 80, which in turn operates a laser diode 95 using a control voltage. Laser diode 95 is part of transmitting unit 90, which further includes an emitting element 96 in the form of a dispersion lens. In addition, the radar system possesses a receiving element 106 (lens) for collecting optical radiation. A photo diode 105 is located behind the receiving element. The output of the photo diode is connected to a mixer 110, which mixes the photo diode signal with the signal of oscillator 80. The mixed signal passes through a low-pass filter (LPF) 120 and then a compensator (COMP) 130. The compensator in turn is connected to the input of analog-digital converter 40 of DSP 60.

DSP 60 controls analog multiplexer 20 for generating a rectangular signal, which oscillates between the voltage values V+ and V−. Integrator 30 generates from this rectangular signal a triangular signal, which is used for controlling oscillator 80. Oscillator 80 produces a high-frequency oscillation in the gigaherz range, modulated with the triangular signal. The laser diode is controlled with this high-frequency oscillation and thus emits intensity-modulated light, the frequency of the modulation varying linearly according to the triangular signal. Thus frequency modulation of the light intensity takes place in stages corresponding to a slope (that is, linear increase and decrease of the modulation frequency). Light scattered back from solid or diffuse objects is collected by receiving element 106 and converted into an electrical signal by photo diode 105. Mixer 110 generates sum and differential frequency signals. Low-pass filter 120 is adjusted so that it lets through only differential frequency components of the mixed signal of interest. This occurs, for example, in the case of a limiting frequency of 500 MHz of the filter, when the maximum frequency deviation of oscillator 80 is of this order of magnitude.

Compensator 130 is given by the edge of a high-pass filter, or band pass filter, acting as a fourth-order differentiating element. This filter produces an intensity correction, by passing components of higher differential frequencies better. In this way the intensity decrease of the optical radiation is compensated in the case of a far-away scattering object. The differentiating element here is of the fourth order, since for objects in the remote field of the transmitter the received intensity is damped both by the path of the transmitted signal as well as by the path of the scattered signal, so that the inverse quadratic proportionality of the intensity to the distance is to be taken into account two times, and the differential frequency signal of each scattering object, passed by the low-pass filter, has a power which is inversely proportional to the fourth power of the differential frequency. This is exactly what is compensated by fourth-order differentiating element 130.

Analog-digital converter 40 digitizes the mixed signal of the differential frequency components obtained and corrected in their intensity; FFT 50 provides a spectral analysis of the mixed signal capable of being evaluated by the DSP. The relationship between spectral intensity and differential frequency here is a direct reflection, for example, of the spatial density distribution of a fog bank representing the back-scattering object. The DSP transmits the spectral analysis directly to the display unit, so that the driver of the vehicle learns the distance at which a fog bank is located, and how far the latter extends in the direction of travel.

Alternatively, in the case of recognizably short visual range (for example when it is less than a specific distance to the fog bank), to warn the driver accordingly via the display unit or via separate lights or warning sounds, or to switch on the fog lights automatically.

As is known in this case from German Patent Application No. 196 32 889, a differential frequency fdiff corresponds to a specific distance L, at which the scattering object (either a solid body or a particle-containing volume of air, for example a volume element of a fog bank) is located. In this case L is given by $$L = fdiff \times c / (2 \times df/dt),$$

c representing the speed of light and df/dt the constant rise, respectively fall, of the modulation frequency in the frequency slopes induced by the triangular signal. For example, if a frequency deviation of 500 MHz corresponding to the maximum frequency deviation of the VCO is chosen, and a measuring time of 1 second is set for this (which then corresponds to a frequency of the triangular signal of 0.5 Hz), df/dt=500 MHz/1 s. A frequency resolution of the FFT of 1 Hz results because of the measuring time of 1 second. If the FFT has 512 interpolation points for the analysis of the mixed signal, the highest resolvable differential frequency amounts to 256 Hz. Because of the above-mentioned relationship between L and fdiff, this corresponds to a distance of 76.8 m, and 1 Hz corresponds to 30 cm. Thus, in this example (diffuse) objects can be detected up to a distance of 76.8 meters with a local resolution of 30 cm. The measuring times can be shortened in the case of a given frequency deviation within the framework of the steerability (input time constants of the VCO), in order to reduce the undesirable averaging influence of the motion of travel. The differential frequency components of the signal mixture generated by mixer 110 are accordingly of higher frequency.

Figure 1B:
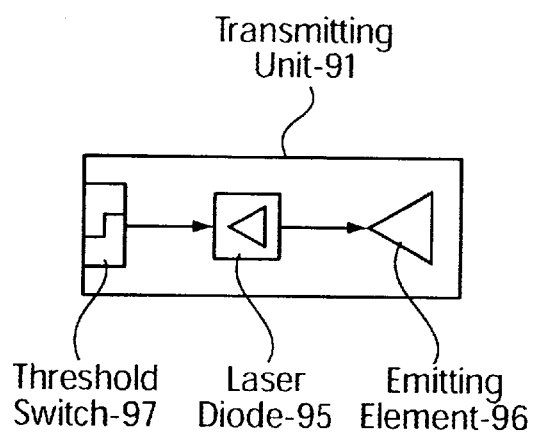
FIG. 1b shows a detail of a second embodiment.

FIG. 1b shows an alternative transmitting unit 91, which may be used instead of transmitting unit 90. Transmitting unit 91 includes a threshold switch 97, whose output signal controls laser diode 95, which emits its light via emitting element 96 in the way already described.

Threshold switch 97 converts the sinusoidal oscillation of oscillator 80 into a rectangular signal, so that it is possible to use laser diodes of higher power than laser diode 95, available for optical communication, which are designed for pulse modulation. The rectangular signal still includes the original sine wave as the fundamental wave. Furthermore, mixing in the multiplier takes place with the sine signal. The harmonic waves of the rectangular oscillation remain without influence on the signal mixture to be evaluated, as long as the limiting frequency of the low-pass filter is chosen suitably. The arrangement composed of mixer and low-pass filter in principle represents a correlator (multiplication of two signals and integration of the product), in the case of which a correlate that is variable in time is obtained because of the short time integration (low-pass filter), that is, actually a "slowly" variable continuous component is evaluated. Since the harmonic waves of the rectangle are orthogonal to the fundamental wave, the system also functions as described, namely with a rectangle and the sine of the fundamental wave. The limit frequency of the low-pass filter in this case must lie below the lowest used instantaneous frequency of the VCO. This specific embodiment makes use of the fact that if light is used as a carrier, it is not necessary to pay attention to spectral purity or band limitation, since presently there are no specifications for modulated light with respect to the frequencies usable for modulation. At the present time this is also not necessary, since light is transported for communication purposes anyway, except that it is transported enclosed, preferably in glass fibers.

Figure 2A:
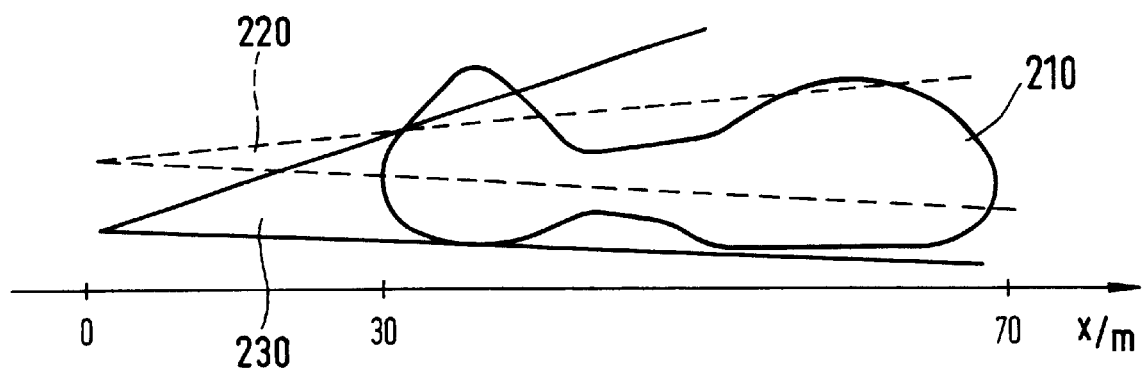
FIG. 2a shows a fog bank.

FIG. 2a shows a schematic representation of a fog bank 210, which is located at a distance range of 30 to 70 meters in front of a vehicle, the x coordinate of which is at the origin. Area 220, covered by emitting elements 90 and 91, is marked with dotted lines. The receiving area of receiving element 106 is marked with solid lines and with reference symbol 230.

Figure 2B:
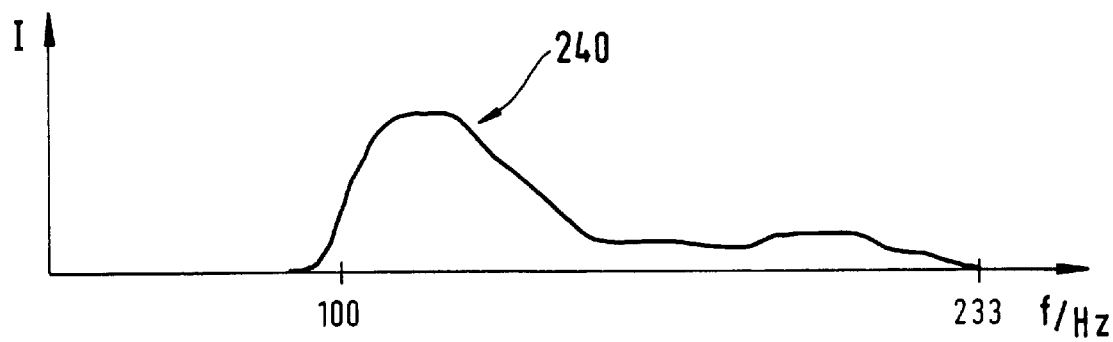
FIG. 2b shows a first distance profile corresponding to the fog bank.
Figure 2C:
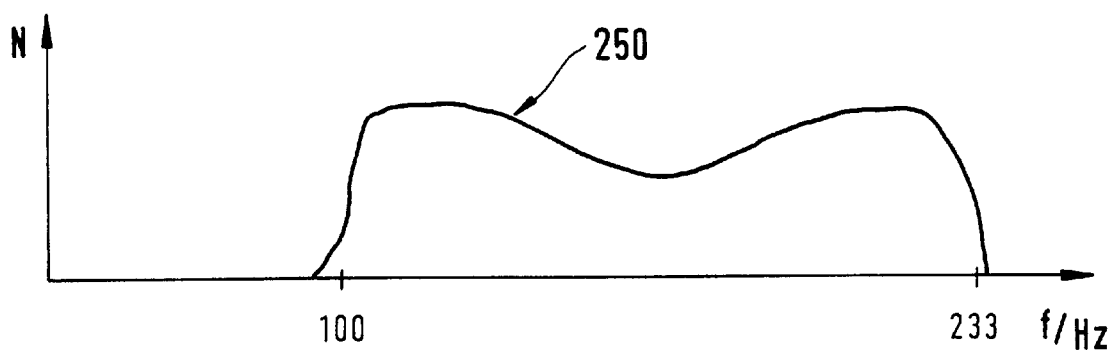
FIG. 2c shows a second distance profile corresponding to the fog bank.

The radar system provides display unit 70 with first curve 240 shown in FIG. 2b, for example, starting from the object position shown in FIG. 2a. It represents the uncompensated (that is, obtained without the use of compensator 130) Fourier spectrum I of the differential frequency signal mixture, the differential frequencies corresponding to the spatial extent of the fog bank in the x-direction detecting a range between 100 and 233 Hz. If, however, the radar system is equipped with compensator 130, the normalized Fourier spectrum N (second curve 250), which represents an image of the relative spatial distribution of the fog density, is shown. Comparative values, which were determined from comparison measurements on a test fog area of variable density (particles per cubic meter) in transmitted light and with which the display is calibrated, may be stored for representing the absolute fog density. If individual "solid" or larger elongated objects are found in the area investigated, the detected spectrum will contain discrete "surges" or pronounced peaks. The latter may be detected and masked out with an appropriate filter mask (not described further here).

What is claimed is:

1. A radar system comprising:
   means for generating a frequency-modulated transmitted signal, a power of the transmitted signal being frequency-modulatable with linear frequency variation in time intervals;
   means for receiving signals reflected from an object;
   means for multiplying the transmitted signal by the reflected signals;
   a frequency analyzer for calculating a frequency spectrum corresponding to a distance profile as a function of differential frequency signals;
   a low-pass filter; and
   means, coupled downstream from the low-pass filter upstream from the frequency analyzer, for automatically compensating for a signal strength of the reflected signals, the signal strength depending on a distance of the reflecting object.

2. The radar system according to claim 1, wherein the radar system is an FMCW radar system for a motor vehicle.

3. The radar system according to claim 1, wherein the frequency analyzer includes a fast Fourier transformer.

4. The radar system according to claim 1, wherein the means for compensating includes a fourth-order differentiating element.

5. The radar system according to claim 4, wherein the differentiating element is formed by a corresponding edge of at least one of a high-pass filter and a band pass filter.

6. The radar system according to claim 1, wherein the transmitted signal is a light signal.

7. The radar system according to claim 6, wherein the means for generating includes a laser diode for providing the light signal.

8. The radar system according to claim 6, wherein the means for generating includes a high-power light diode for providing the light signal.

9. The radar system according to claim 1, wherein the transmitted signal is divergently emissible.

10. The radar system according to claim 1, wherein the transmitted signal is rectangularly modulatable.

* * * * *